US011995699B2

(12) United States Patent
Muramoto

(10) Patent No.: US 11,995,699 B2
(45) Date of Patent: May 28, 2024

(54) COMMODITY RECOMMENDATION SYSTEM

(71) Applicant: Peace Tec Lab Inc., Tokyo (JP)

(72) Inventor: Rieko Muramoto, Tokyo (JP)

(73) Assignee: PEACE TEC LAB INC., Tokyo (JP)

(*) Notice: Subject to any disclaimer, the term of this patent is extended or adjusted under 35 U.S.C. 154(b) by 233 days.

(21) Appl. No.: 17/287,458

(22) PCT Filed: Oct. 9, 2019

(86) PCT No.: PCT/JP2019/039750
§ 371 (c)(1),
(2) Date: Apr. 21, 2021

(87) PCT Pub. No.: WO2020/085086
PCT Pub. Date: Apr. 30, 2020

(65) Prior Publication Data
US 2021/0383452 A1 Dec. 9, 2021

(30) Foreign Application Priority Data

Oct. 23, 2018 (JP) ................................. 2018-199466

(51) Int. Cl.
*G06Q 30/00* (2023.01)
*G06F 16/2457* (2019.01)
*G06Q 30/0601* (2023.01)

(52) U.S. Cl.
CPC ... *G06Q 30/0631* (2013.01); *G06F 16/24578* (2019.01)

(58) Field of Classification Search
CPC .................... G06Q 30/06–08; G06F 16/24578
See application file for complete search history.

(56) References Cited

U.S. PATENT DOCUMENTS 8,170,916 B1 5/2012 Dicker et al.
10,002,375 B1 * 6/2018 Scythes .............. G06Q 30/0623
(Continued)

FOREIGN PATENT DOCUMENTS

CN 107862566 A 3/2018
JP 2003-281429 A 10/2003
(Continued)

OTHER PUBLICATIONS

ISA/JP, International Search Report (with translation) dated Jan. 7, 2020 in International Application No. PCT/JP2019/039750, 5 pages.

*Primary Examiner* — Ethan D Civan
(74) *Attorney, Agent, or Firm* — MASUVALLEY & PARTNERS; Peter Martinez

(57) ABSTRACT

The present invention provides a commodity recommendation system comprising: (1) means for detecting tags from data of purchased commodities based on a purchase history in a user database; (2) means for creating and recording a feature table for each purchased commodity by associating the assigned tags with the purchased commodity; (3) means for ranking the tags with respect to the whole purchased commodity of a user and storing them by repeatedly performing the 1) and the 2) for each purchased commodity; (4) means for registering a list of the ranked tags in the user database in association with the user; (5) means for extracting one or more ranked tags from the user database upon a request and creating a tag combination; (6) means for extracting a commodity that matches the created tag combination; and (7) means for displaying the extracted commodity on a designated terminal.

4 Claims, 7 Drawing Sheets

(56) References Cited

U.S. PATENT DOCUMENTS

| | | |
|---|---|---|
| 2012/0101889 A1 | 4/2012 | Kurata et al. |
| 2015/0074114 A1 | 3/2015 | Saito |
| 2015/0295664 A1 | 10/2015 | Kobayashi et al. |
| 2016/0284007 A1 | 9/2016 | Sakai |

FOREIGN PATENT DOCUMENTS

| | | |
|---|---|---|
| JP | 2007-058820 A | 3/2007 |
| JP | 2011-243041 A | 12/2011 |
| JP | 2012-198722 A | 10/2012 |
| JP | 2013-232108 A | 11/2013 |
| JP | 2014-035707 A | 2/2014 |
| JP | 2015-184769 A | 10/2015 |
| JP | 2015-201791 A | 11/2015 |
| JP | 2016-181196 A | 10/2016 |
| JP | 2017-027597 A | 2/2017 |
| JP | 2017-091054 A | 5/2017 |
| JP | 2018-160001 A | 10/2018 |
| WO | WO 2018/070026 A1 | 4/2018 |

\* cited by examiner

| Tag Section | Tag Type | Tags | |
|---|---|---|---|
| Item Classification | Classification | Beauty | Face Care |
| | Efficacy | Eye Massager | Eye Care |
| | | Relax | Blood Circulation Promotion |
| | Family Structure | N/A | |
| Item Individual | Function / Feature | Music Function | Warming Function |
| | | USB Rechargeable | Fold in half |
| | | Convenient to carry | Usable overseas |
| | Price | 6980 yen (medium price range) | |
| | Color | White | |
| | Family Structure | N/A | |
| | Other | Latest Commodity | Relax |
| | | | Removing fatigue |
| | | | Feeling warmth |
| | | | Shoulder Ache |

Fig. 2

COMMODITY RECOMMENDATION SYSTEM

RELATED APPLICATION

This application is the U.S. National Phase of and claims priority to International Patent Application No. PCT/JP2019/039750, International Filing Date Oct. 9, 2019; which claims benefit of Japanese Patent Application No. 2018-199466 filed Oct. 23, 2018; both of which are incorporated herein by reference in their entireties.

TECHNICAL FIELD

The present invention relates to a system for providing a service on a network such as the Internet. In particular, the present invention relates to a system for presenting a recommended commodity to a user by determining an arbitrary user preference according to a user's request or automatically.

BACKGROUND ART

In consumer purchasing activities, the preference of the purchaser has a great influence on whether or not a commodity is purchased. For example, when a consumer purchases a commodity at an EC site (E-Commerce Site) on the Internet, a purchase history at the EC site is stored and registered to be managed by a business operator. On the basis of the managed information, it is possible to extract a recommended commodity in the EC site, or it is possible to display the same or similar commodity as the commodity browsed or purchased in an application push, a pop-up advertisement or the like. By using such information, in various industries, there is a system for extracting a commodity that matches the preference of a consumer and presenting information of the commodity (Patent Document 1 and Patent Document 2). There is also an attempt to analyze such information and collect preference information (Patent Document 3).

However, what is realized by the above techniques is selecting and presenting a commodity matched with the preference of the user on the basis of the browsing and/or purchased recording of commodities. The user's preference is not always constant, and is affected by a season, a trend, a self-health condition, a living environment, a family environment and the like. Accordingly, there is a need for a system for recommending a commodity in response to such a change.

RELATED ART DOCUMENT

Patent Document

Patent Document 1 is JP-A 2017-27597
Patent Document 2 is JP-A 2015-184769
Patent Document 3 is JP-A 2015-201791

SUMMARY OF THE INVENTION

Problems to be Solved by the Invention

A commodity recommendation system for widely presenting commodities favored by a user is to be provided.

Means of Solving the Problems

In order to solve the above problem, the applicant provides a commodity recommendation system comprising:

1) means for detecting tags from data of purchased commodities based on a purchase history of a user in a user database;
2) means for creating and recording a feature table for each purchased commodity by associating the assigned tags with the purchased commodity;
3) means for ranking the tags with respect to the whole purchased commodity of the user and storing them by repeatedly performing the 1) and the 2) for each purchased commodity;
4) means for registering a list of the ranked tags in the user database in association with the user;
5) means for extracting one or more ranked tags from the user database upon a request and creating a tag combination;
6) means for extracting a commodity that matches the created tag combination; and
7) means for displaying the extracted commodity on a designated terminal.

In the commodity recommendation system according to the present invention, the system further comprising:

A) means for extracting customers of the same segment as the user from attribute information of the user;
B) means for performing the 1) means to the 4) means for each customer of the same segment as the user to create a list of tags of purchased commodities of the whole customer of the segment;
C) means for extracting the tags of the purchased commodities of the segment and creating a tag combination; and
D) means for extracting a matched commodity based on this created tag combination and the tag combination created by the 6).

In the commodity recommendation system according to the present invention, the system further comprising:

means for acquiring arbitrary external environment information, detecting the tags of the purchased commodity of the user and changing the ranking of an original commodity table; or means for acquiring arbitrary external environment information, detecting the tags of the purchased commodity of the customer of the segment and changing these ranking.

In the commodity recommendation system according to the present invention, the system being configured to perform means for selecting the matched commodity upon a request from the designated terminal by limiting a commodity segment.

In the commodity recommendation system according to the present invention, one or more pieces of information is meta information.

In the present invention, meta information is collected from Web information such as an EC site, a blog, an SNS (Social Networking Sites), a moving image, etc. logged in by a user to create a tag for the preference of the user himself or herself described therein. By segmenting a family of the user from the user attribute information, similarly to the case of the user individual, meta information is collected from Web information such as an EC site, a blog, an SNS, a moving image, etc. logged in by each person of the family to create a tag for the preference of the user himself or herself described therein. Also, a plurality of users including many elements close to the user attribute information can be extracted from the same EC site and SNS to create a segment close to the user attribute. In a general EC site, only the site operator may browse the personal information constituting the segment, or only the attribute and the purchase information is pooled so as not to specify the individual.

By creating the segment, it is possible to create a table of tags for commodities purchased in this segment. When recommending a commodity to a new user by cooperative filtering, it is possible to eliminate a trouble from shortage of information of the user by creating such a segment and an information table. Categories for the preference of a user or a segment includes beauty, cooking, meal, health, sports, IT and AV, travel, fashion and the like. Tags for preference of each of the categories can be extracted to create a sub-category.

According to the present invention, it is possible to assign not only a tag from a history of search, browsing, purchase behavior and attribute information of a user, but also a unique tag to a searched commodity that has not been purchased. Such information not only estimates the preference of the user individual but also becomes useful information for the site operator. In this specification, data refers to data in which a fact is recorded. The recording medium includes, but is not limited to, a hard disk, a CD-R, a USB memory, a various server and the like. Specifically, the data includes characters, numerical values, images, voices and the like. Further, in this specification, information refers to information used interchangeably with data.

According to the present invention, commodities in a purchase history of a certain user are tagged. Feature tables are created from the tagged commodities. Then, the tagged commodities can construct a relational database for each user. When the user logs in the EC site to try to purchase a commodity, a frequent tag is picked up in ascending order from the relational table constructed in the database, and rows of the relational database are selected to change an order thereof.

In the present invention, tags can be divided into types. For example, tags can be roughly classified into an "Item Classification Tag" and an "Item Individual Tag". For each of the tags, tagging is performed with respect to each of contents of "classification", "efficacy", "family structure", "function", "price", and "evaluation".

Effects of the Invention

The commodity recommendation system of the present invention enables a wide range of commodity selection within a range in line with a user's preference depending on how these ranked tags are selected, when the user selects a commodity. Further, the commodity recommendation system of the present invention is capable of multiplying data generated based on a purchase history of a user with external environment data to present a commodity suitable for the user's preference and suitable for the user's living environment.

BRIEF DESCRIPTION OF THE DRAWINGS

FIG. 2 shows an example of tags when a commodity of the present invention is a home electric appliance (eye massager).

FIG. 6 shows the aspect by extracting a part from FIG. 1 or FIG. 5.

FIG. 7 shows the aspect by extracting a part from FIG. 1 or FIG. 5.

MODE FOR CARRYING OUT THE INVENTION

Preferred embodiments of the present invention will be described below.

Figure 1:
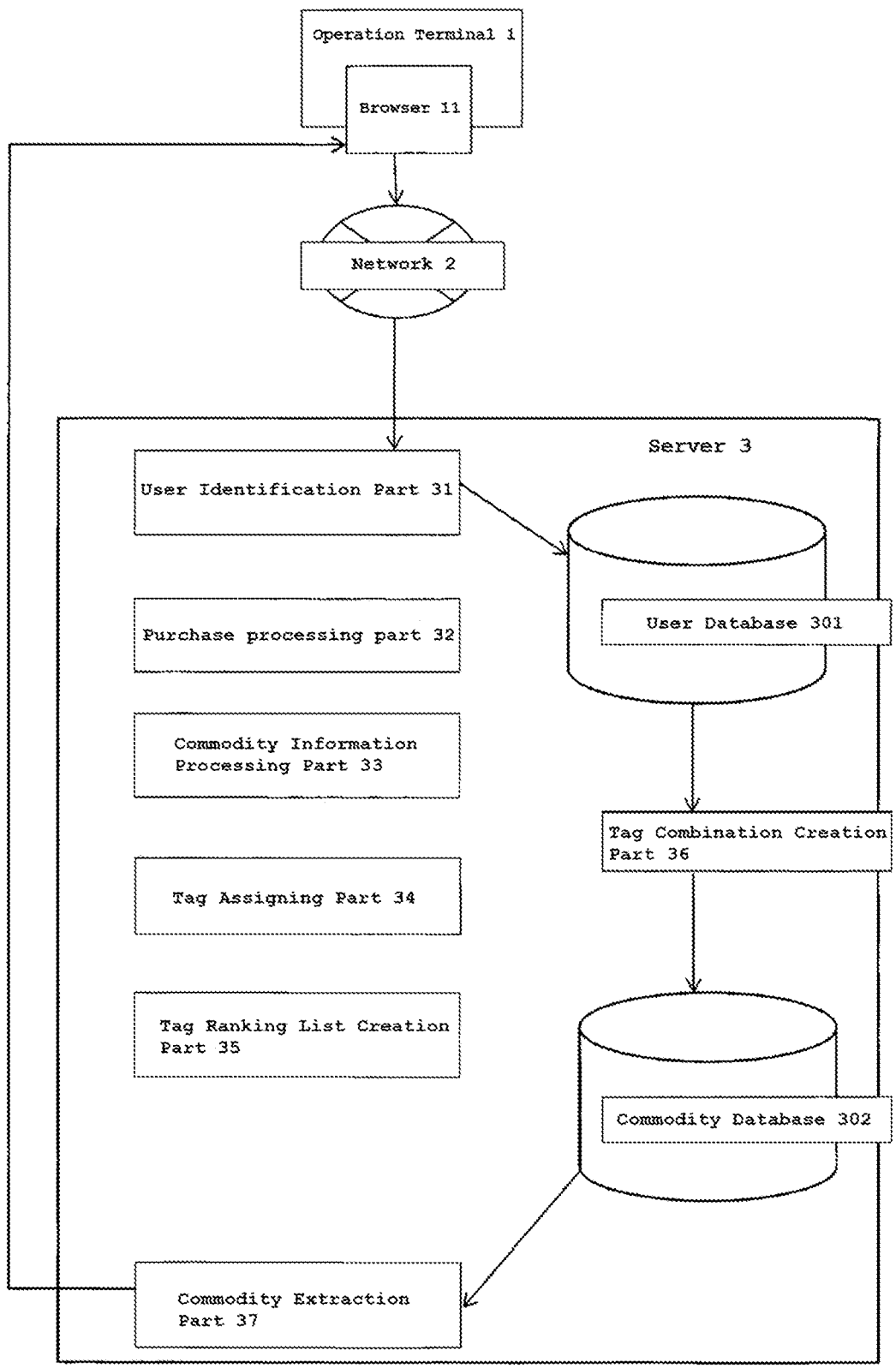
FIG. 1 is a diagram showing a configuration example of a system according to an embodiment of the present invention.

In FIG. 1, a network 2 is connected to an operation terminal 1 such as a PC or a cellular phone operated by a user or a person who executes the system of the present invention. The network 2 may be the Internet or a network in an arbitrary type such as a wired or wireless LAN.

When the network 2 is the Internet, the operation terminal 1 may be a cellular phone, a PC, or an arbitrary information terminal. When a clerk uses the present invention when serving customers in a store, the network 2 may be a wired or wireless LAN.

When the operation terminal is connected to the network 2 by a user, a user identification part 31 identifies the user in a server 3. Then, a tag combination is created by a tag combination creation part based on a ranking list of tags and a purchase history recorded in a user database 301. The tag combination is generated by the following steps. First, when commodities are purchased by the user, information of the commodities processed by a purchase processing part 32 in the server is transmitted to a commodity information processing part 33. The commodity information processing part 33 extracts one or more elements from the information of the purchased commodities. The number of elements to be extracted can be set for each commodity or can be set by the user. The elements may be, for example, entity data to be viewed on a Web browser or data based on meta information, or may be any of these.

Tags are assigned to the extracted one or more elements by a tag assigning part 34. The assigned tags are ranked by a ranking list creation part in descending order of appearance frequency. The tag ranking list may be registered in the user database or recorded in a storage part (not shown) of the server. In the aspect of FIG. 1, the list created by the tag ranking list creation part is recorded in the user database 301. The ranking list is updated each time the same user purchases a commodity. The update timing can be arbitrarily set.

When the operation terminal 1 is connected to the network, the tag combination creation part picks up elements from the tag ranking list to create a tag combination. When creating the tag combination, machine learning means, deep learning means or the like can be used. In the tag ranking list, tags to be a combination can be selected in accordance with changes in user attributes and changes in external environment.

Data created by the tag combination creation part 36 is sent to a commodity database 302. From the database, information of a commodity that matches the data created by the tag combination creation part 36 is sent to a commodity extraction part 37. The commodity whose information is to be sent to the commodity extraction part 37 is, for example, a commodity satisfying the elements of the tags as described above. Alternatively, a commodity that shows a certain degree of similarity to the tag combination may be selected as a commodity whose information is to be sent to the commodity extraction part 37. Further, access commodities on the commodity database side may be segmented so as to perform matching with the data created by the tag combination creation part 36 from newly arrived commodities, for example.

The commodity whose information is sent to the commodity extraction part 37 is displayed on a browser 11 of the operation terminal. The number of commodities displayed on the browser 11 may be one, a plurality of commodities ranked from the result of the matching may be displayed, or the matching result may be displayed for each commodity category.

FIG. 2 shows an example of tags in a case where a commodity is a home electric appliance as an aspect in the present invention. Meta information processed by the commodity information processing part is applied to items as described in the table to generate tags of the commodity. In FIG. 2, the example of tags of the home electric appliance has been described. In this regard, by acquiring not only these tags but also information of changes in the user attributes and the external environment information as described later, the commodity matching and recommendation are performed in the present invention.

Figure 3:
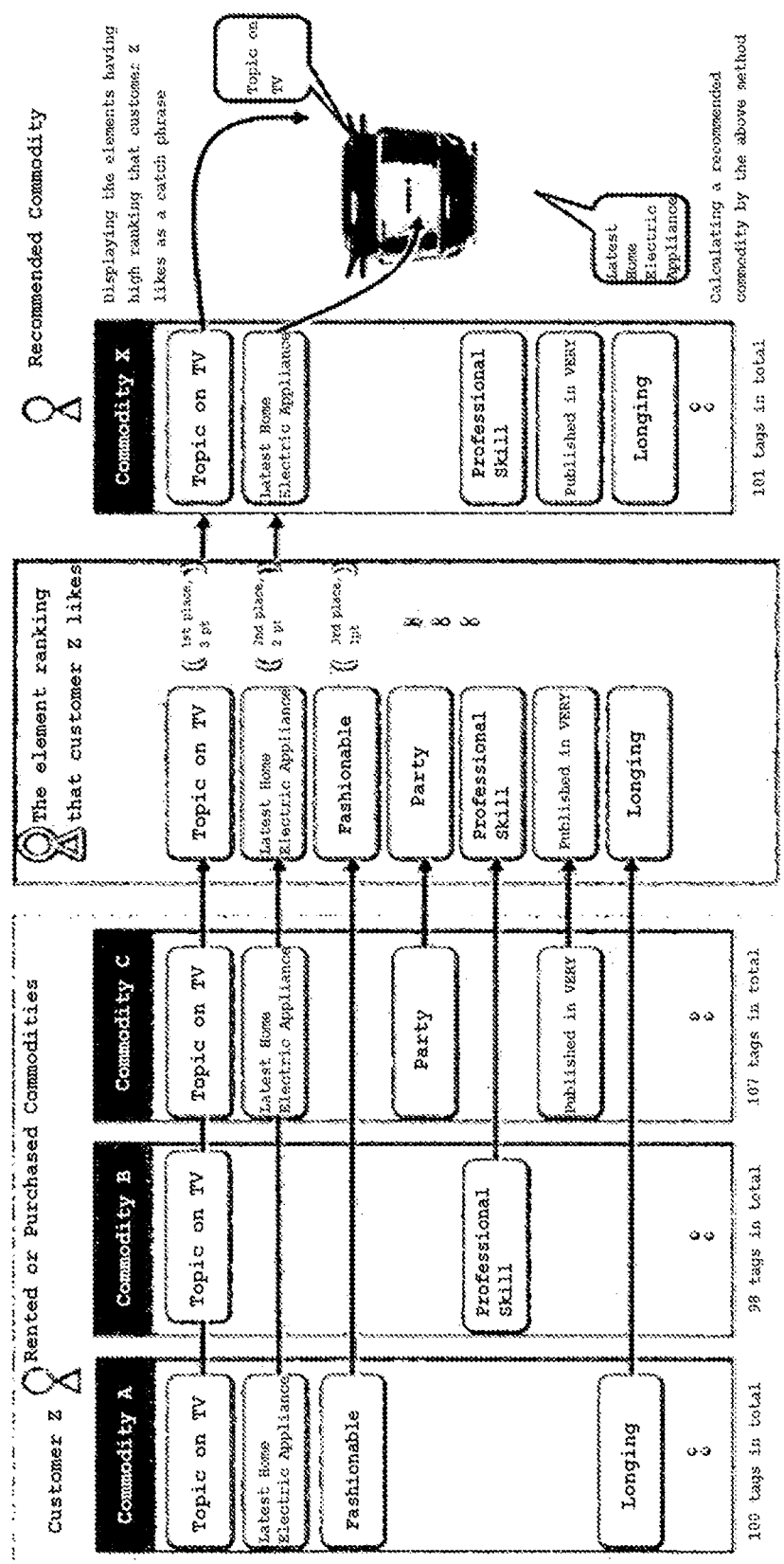
FIG. 3 is a diagram showing an example of a data structure generated by the present invention when commodities of the present invention are home electric appliances.

FIG. 3 shows a data structure generated by the tag ranking list creation part 45 when commodities are home electric appliances as an aspect of the present invention. As an example, tags based on meta information or the like which is extracted for each of commodities A, B and C purchased by a customer Z are listed in the user database 301. For each commodity purchased by the customer Z, these tags are ranked in descending order of appearance frequency to generate a tag ranking list. Referring to FIG. 3 as an example, information tagged as "topic on TV" and "latest home electric appliance" has high ranking. Information such as "magazine publication", "longing", "professional skill" and the like can be ranked by acquiring the user attribute information or the external environment information as described later. For example, as the external environment information, "magazine publication", "longing" and "professional skill" can be picked up from magazine publication information to set the combination creation part. The combination creation part 36 can set not only a combination created by picking up all the ranked tags but also a combination including tags of all commodities.

Figure 4:
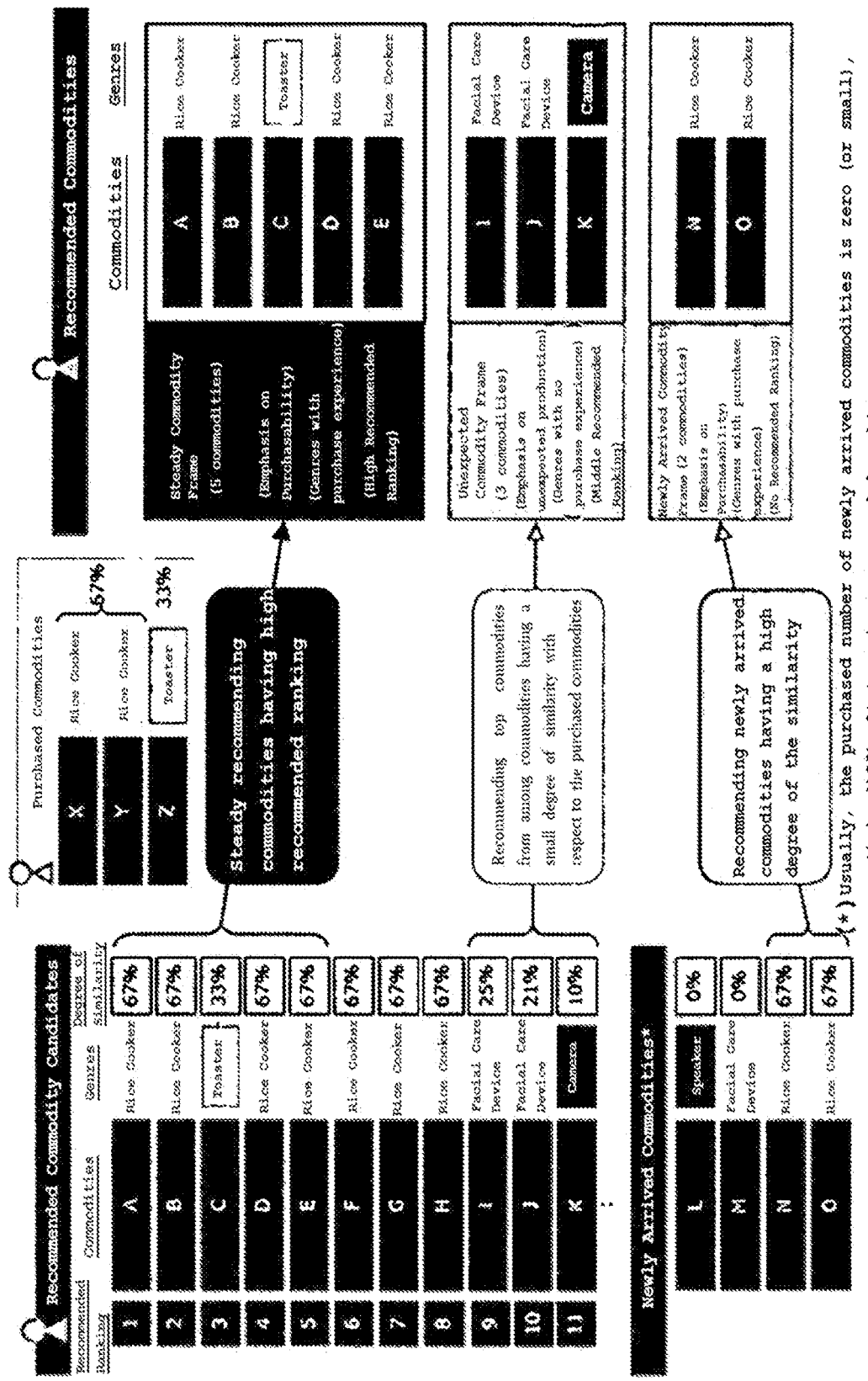
FIG. 4 is a diagram showing commodity examples recommended by the present invention when commodities of the present invention are home electric appliances.

Referring to FIG. 4, commodities recommended by the present invention will be described. In the aspect of FIG. 1, when the tag combination creation part 36 combines tags in in descending order of similarity to the items tagged in the tag ranking list creation part 35 to extract commodities, the commodities can be sorted in "steady commodity frame" of FIG. 4. When extracting commodities corresponding to high ranking of a commodity group having a small degree of the similarity in which unexpectedness can be found, the commodities can be sorted in "unexpected commodity frame". Further, it is possible to extract commodities having a high degree of the similarity from the new arrival category, and it is also possible to extract commodities such as steady commodities or commodities having unexpectedness from classified groups such as formal, casual and unisex.

Figure 5:
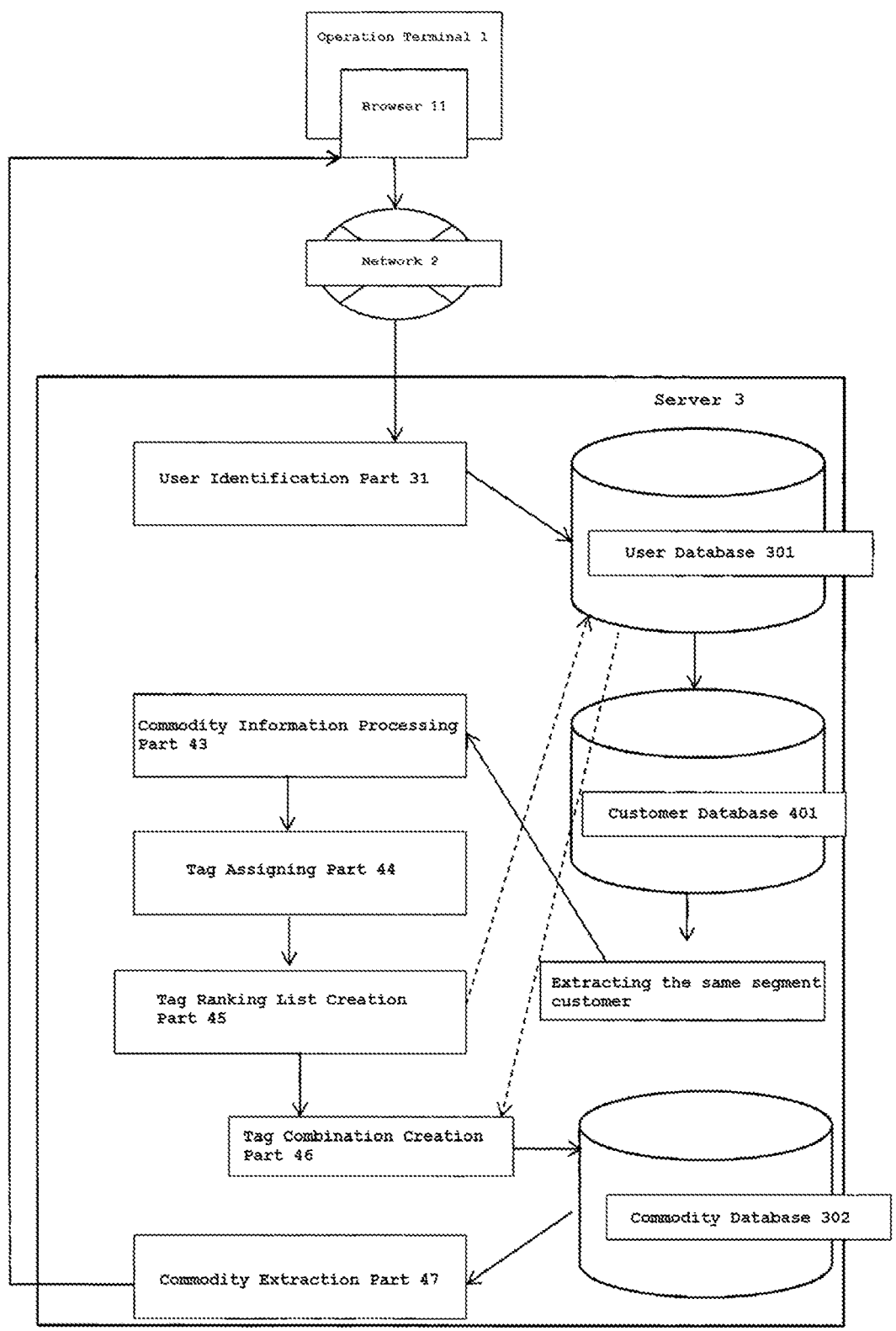
FIG. 5 is a configuration diagram showing a correspondence in which the same customer segment as a user is extracted from a user database and this customer purchase data is utilized in the present invention.

Referring to FIG. 5, in a customer database 401, a customer of the same segment is extracted from the user attribute information registered in the user database 301. A commodity information processing part 43 extract commodity information from the customer information of the same segment for purchased commodities of the customer, a tag assigning part 44 performs tagging, and a tag ranking list creation part 45 creates a list of commodity tags. The list of the commodity tags may be used in a tag combination creation part 46 for extracting a commodity to be recommended as it is, or once registered in the user database 301. According to instructions of the operation terminal 1, the tag combination creation part may generate a tag combination, which is used for the commodity matching, based on a tag ranking list of a user recorded in the user database 301 and a tag ranking list generated by extracting the same customer segment as the user.

Information processing operations performed by the commodity information processing part 43, the tag assigning part 44 and the tag ranking creation part 45 with respect to the purchased commodity data of the same segment customer in FIG. 5 are substantially the same as information processing operations performed by the commodity information processing part 33, the tag assigning part 34 and the tag ranking creation part 35 in FIG. 1.

Figure 6:
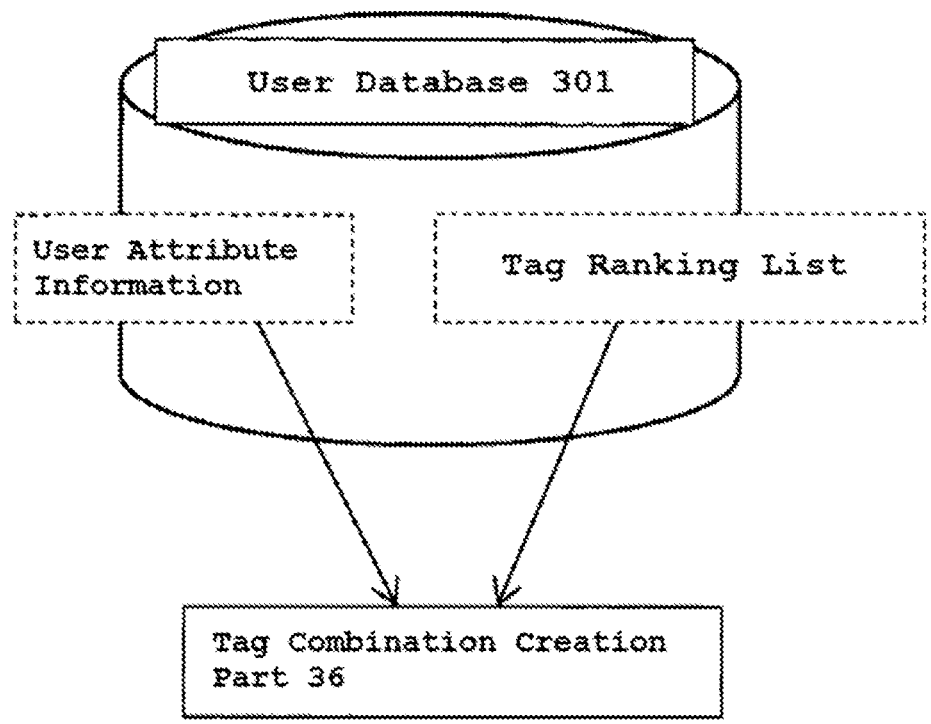
FIG. 6 is a diagram showing an aspect of a user database for creating a tag combination by utilizing user attribute information in a tag combination creation part in the present invention.

In FIG. 6, user attribute information registered in the user database 301 is referred to when creating a tag combination. The user attribute information means information such as the user's age, address, family structure, height, weight and health condition. The attribute information registered in the user database 301 may be arbitrarily updated by the user or may be automatically updated by access from an external information terminal.

Figure 7:
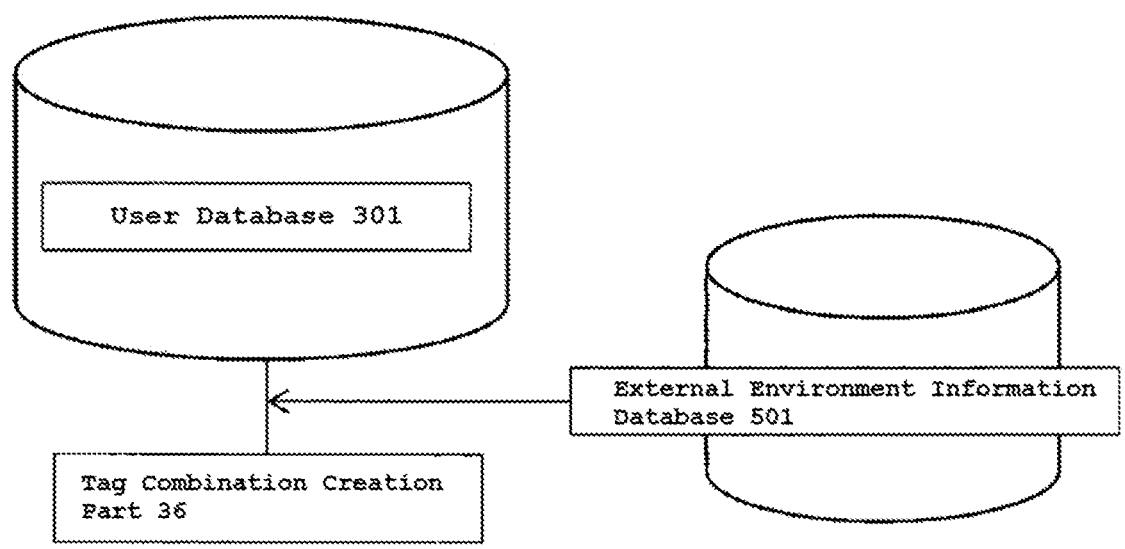
FIG. 7 is a diagram showing an aspect of a user database for creating a tag combination by utilizing external environment information in a tag combination creation part in the present invention.

In FIG. 7, external environment information from another external database is referred to when creating a tag combination. The external environment information includes information other than the user attribute information. As an example, there are a season, a temperature, a trend, an application and the like. For example, if a user has a purchase history of clothing for spring and summer, and it is the first time for the user to purchase clothing for winter, a correction can be made with materials, items and the like. When making this correction, information can be combined not only from information of the external database but also from the segmented customer information.

INDUSTRIAL APPLICABILITY

The commodity recommendation system of the present invention enables a wide range of commodity selection within a range in line with a user's preference depending on how these ranked tags are selected, when the user selects a commodity.

Further, the commodity recommendation system of the present invention is capable of multiplying data generated based on a purchase history of a user with external environment data to present a commodity suitable for the user's preference and suitable for the user's living environment.

The present invention is not limited to the above-described embodiments, and various modifications can be made without departing from the gist of the present invention. In addition, the features described in the plurality of embodiments may be arbitrarily combined.

EXPLANATION OF REFERENCE NUMERAL

1: Operation terminal
11: Browser
2: Network

3: Server
31: User identification part
32: Purchase processing part
33: Commodity information processing part
34: Tag assigning part
35: Tag ranking list creation part
36: Tag combination creation part
37: Commodity extraction part
301: User database
302: Commodity database
501: External environment information

What is claimed is:

1. A commodity recommendation system comprising:
a server
1) detecting tags from data of purchased commodities based on a purchase history of a user in a user database;
2) creating and recording a feature table for each purchased commodity by associating the assigned tags with the purchased commodity;
3) Ranking the tags with respect to the whole purchased commodity of the user and storing them by repeatedly performing the 1) and the 2) for each purchased commodity and select tags to be a combination in accordance with changes in external environment including information of external database and segmented customer information;
4) Registering a list of the ranked tags in the user database in association with the user;
5) Extracting one or more ranked tags from the user database upon a request and creating a tag combination; and
6) extracting a commodity that matches the created tag combination; and
7) a browser displaying the extracted commodity on a designated terminal; the server further
A) extracting customers of the same segment as the user from attribute information of the user;
B) performing the 1) to the 4) for each customer of the same segment as the user to create a list of tags of purchased commodities of the whole customer of the segment;
C) extracting the tags of the purchased commodities of the segment and creating a tag combination in descending order or ascending order of similarity; and
D) extracting a matched commodity based on this created tag combination and the tag combination created by the 6).

2. The commodity recommendation system according to claim 1 the server further comprising: acquiring arbitrary external environment information including a season, a temperature, a trend, or an application which are information other than user attribute information, detecting the tags of the purchased commodity of the user and changing rankings of an original commodity table; or means for acquiring arbitrary external environment information, detecting the tags of the purchased commodity of the customer of the segment and changing these rankings.

3. The commodity recommendation system according to claim 1 being configured to select the matched commodity upon a request from the designated terminal by limiting a commodity segment.

4. The commodity recommendation system according to claim 1, wherein one or more pieces of information is meta information.

* * * * *